United States Patent
Nose et al.

(10) Patent No.: US 8,363,203 B2
(45) Date of Patent: Jan. 29, 2013

(54) LIQUID CRYSTAL DISPLAY WITH REWRITING IMAGE AND HEAT DIFFUSING SECTION CONTACT BOTTOM SURFACE OF DISPLAY SECTION AND ELECTRONIC APPARATUS HAVING THE SAME

(75) Inventors: Masaki Nose, Kawasaki (JP); Hisashi Yamaguchi, Atsugi (JP)

(73) Assignee: Fujitsu Limited, Kawasaki (JP)

( * ) Notice: Subject to any disclaimer, the term of this patent is extended or adjusted under 35 U.S.C. 154(b) by 607 days.

(21) Appl. No.: 12/551,774

(22) Filed: Sep. 1, 2009

(65) Prior Publication Data
US 2009/0316103 A1    Dec. 24, 2009

Related U.S. Application Data

(63) Continuation of application No. PCT/JP2007/054048, filed on Mar. 2, 2007.

(51) Int. Cl.
    *G02F 1/1333*    (2006.01)
    *C09K 19/02*    (2006.01)
(52) U.S. Cl. ......... 349/161; 349/168; 349/175; 349/185
(58) Field of Classification Search ............ 349/20, 349/161, 175, 185
    See application file for complete search history.

(56) References Cited

U.S. PATENT DOCUMENTS

| | | | |
|---|---|---|---|
| 3,836,243 A * | 9/1974 | Melchior | 353/122 |
| 5,559,614 A * | 9/1996 | Urbish et al. | 349/21 |
| 5,591,789 A * | 1/1997 | Iruvanti et al. | 523/515 |
| 5,694,191 A * | 12/1997 | Strathman et al. | 349/161 |
| 5,786,875 A * | 7/1998 | Brader et al. | 349/20 |
| 5,953,087 A * | 9/1999 | Hoyt | 349/58 |
| 6,146,015 A * | 11/2000 | Weiss | 374/164 |
| 6,700,638 B1 * | 3/2004 | Nousiainen | 349/161 |
| 7,339,563 B1 * | 3/2008 | Goyins et al. | 345/87 |
| 2003/0184644 A1 * | 10/2003 | Takahashi et al. | 347/224 |
| 2003/0206260 A1 * | 11/2003 | Kobayashi et al. | 349/115 |

FOREIGN PATENT DOCUMENTS

| | | |
|---|---|---|
| JP | 56-043677 A | 4/1981 |
| JP | 11-142839 A | 5/1999 |
| JP | 2001-033807 A | 2/2001 |
| JP | 2002-082325 A | 3/2002 |
| JP | 2004-205730 A | 7/2004 |
| JP | 2006-039072 A | 2/2006 |
| JP | 2006319247 | * 11/2006 |

OTHER PUBLICATIONS

International Search Report of PCT/JP2007/054048, mailed date of May 29, 2007.

* cited by examiner

*Primary Examiner* — Hoan C Nguyen
(74) *Attorney, Agent, or Firm* — Westerman, Hattori, Daniels & Adrian, LLP (57) ABSTRACT

A liquid crystal display includes a display section performing display using a liquid crystal, a substrate disposed to face a bottom surface of the display section and having a circuit for driving the liquid crystal mounted thereon, and a heat diffusing section disposed in contact with the bottom surface of the display section and a top surface of the substrate and having thermal conductivity higher than the thermal conductivity of air.

16 Claims, 7 Drawing Sheets

LIQUID CRYSTAL DISPLAY WITH REWRITING IMAGE AND HEAT DIFFUSING SECTION CONTACT BOTTOM SURFACE OF DISPLAY SECTION AND ELECTRONIC APPARATUS HAVING THE SAME

This application is a continuation of International Application No. PCT/JP2007/054048, filed Mar. 2, 2007.

FIELD

The present invention relates to a liquid crystal display used as a display unit of an information apparatus or the like and to an electronic apparatus having the display.

BACKGROUND

Recently, various enterprises and universities are actively engaged in the development of electronic paper. The most promising application of electronic paper is electronic books, and other applications include sub-displays of mobile terminals and display sections of IC cards. One of the most advantageous display method used for electronic paper is the use of a liquid crystal display panel utilizing a cholesteric liquid crystal. A liquid crystal display panel utilizing a cholesteric liquid crystal has excellent features such as semi-permanent display retention characteristics (memory characteristics), vivid color display characteristics, high contrast characteristics, and high resolution characteristics. A cholesteric liquid crystal is obtained by adding a relatively great amount of chiral additive (chiral material) to a nematic liquid crystal (to a chiral content of several tens percent), and it is also called a chiral nematic liquid crystal. A cholesteric liquid crystal forms a cholesteric phase in which nematic liquid crystal molecules are greatly twisted helically to such a degree that incident light will undergo interference reflection.

A liquid crystal display panel utilizing a cholesteric liquid crystal displays an image by controlling the alignment of liquid crystal molecules at each pixel. States of alignment of a cholesteric liquid crystal include a planar state and a focal conic state. Those states exist with stability even when there is no electric field. A liquid crystal layer in the focal conic state transmits light, and a liquid crystal layer in the planar state selectively reflects light rays having particular wavelengths in accordance with the helical pitch of the liquid crystal molecules. A liquid crystal display panel utilizing a cholesteric liquid crystal cannot be properly made to enter the planar state or focal conic state unless a pulse voltage having an optimal pulse width is applied.

Figure 9:
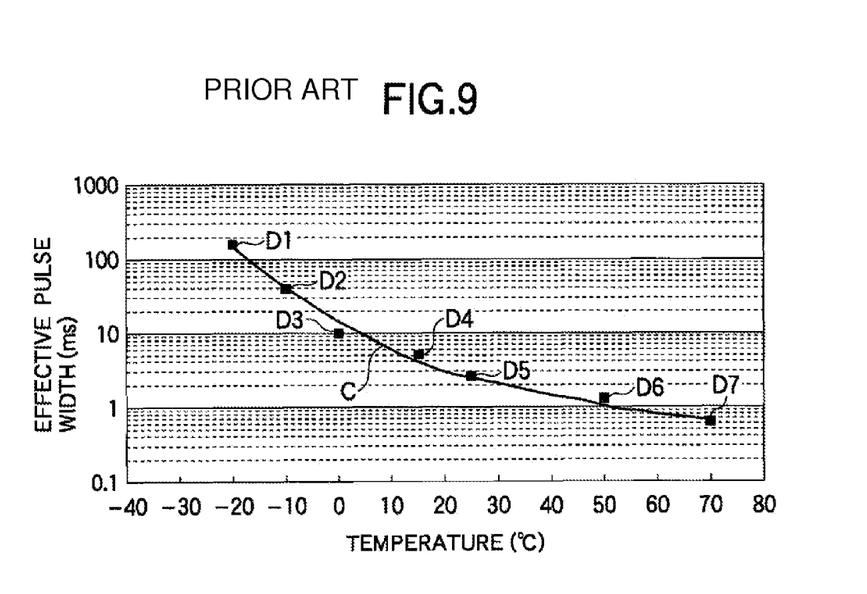
FIG. 9 is a graph depicting an example of a relationship between temperatures and effective pulse widths observed on a cholesteric liquid crystal in a liquid crystal display.

A liquid crystal display panel of this type, which may be used as a display panel of a liquid crystal display, is vulnerable to the influence of temperatures. For example, the viscosity of a cholesteric liquid crystal increases in a manner like an exponential function at low temperatures, which results in a corresponding reduction in the response (γ characteristic) of the cholesteric liquid crystal to a pulse voltage applied to drive the same. For this reason, it is necessary to vary the magnitude or pulse width of the pulse voltage applied to drive the cholesteric liquid crystal depending on temperatures. FIG. 9 illustrates examples of optimal effective pulses widths (ms) associated with temperatures a common cholesteric liquid crystal. Temperatures (C.°) of the cholesteric liquid crystal is illustrated along the horizontal axis, and logarithms of the optimal effective pulse widths (ms) are illustrated along the vertical axis. Referring to FIG. 9, points D1 to D7 represent actual effective pulse widths at respective temperatures, and a curve C is a curve approximated from the points D1 to D7. As depicted in FIG. 9, the optimal effective pulse width applied to the cholesteric liquid crystal is greater, the lower the temperature of the cholesteric liquid crystal. The figure also depicts that the pulse width is smaller, the higher the temperature.

Figure 10:
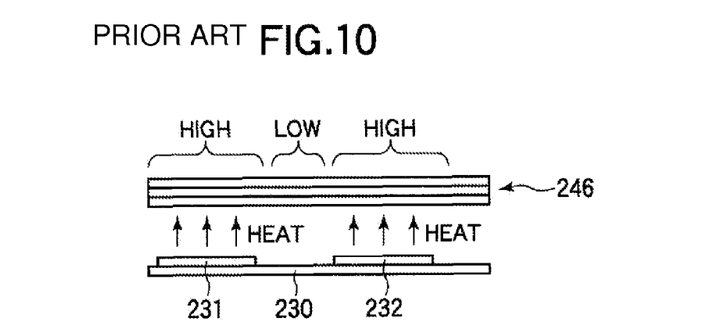
FIG. 10 is an illustration schematically depicting display irregularities of a liquid crystal display.

FIG. 10 is an illustration schematically depicting display irregularities of a liquid crystal display. As depicted in FIG. 10, a liquid crystal display panel 246 of a liquid crystal display may enter a state in which pixel regions at relatively high temperatures and pixel regions at relatively low temperatures coexist (a state what is called temperature irregularities) because of heat emitted from a driving circuit 231, a control circuit 232, and the like provided on a circuit substrate 230 of the panel or heat from not-depicted devices provided inside the liquid crystal display. In such a state, the liquid crystal display panel 246 has the problem of so-called display irregularities attributable to differences in response to substantially the same pulse voltage between the pixel regions at high temperatures and the regions at low temperatures. In order to reduce display irregularities attributable to temperature irregularities as thus described, liquid crystal displays utilizing a cholesteric liquid crystal have been proposed, in which a heat leveling layer is provided on a bottom surface of a light absorbing layer to allow uniform heat radiation substantially throughout the bottom of a display surface (for example, see JP-A-2002-82325).

Figure 11:
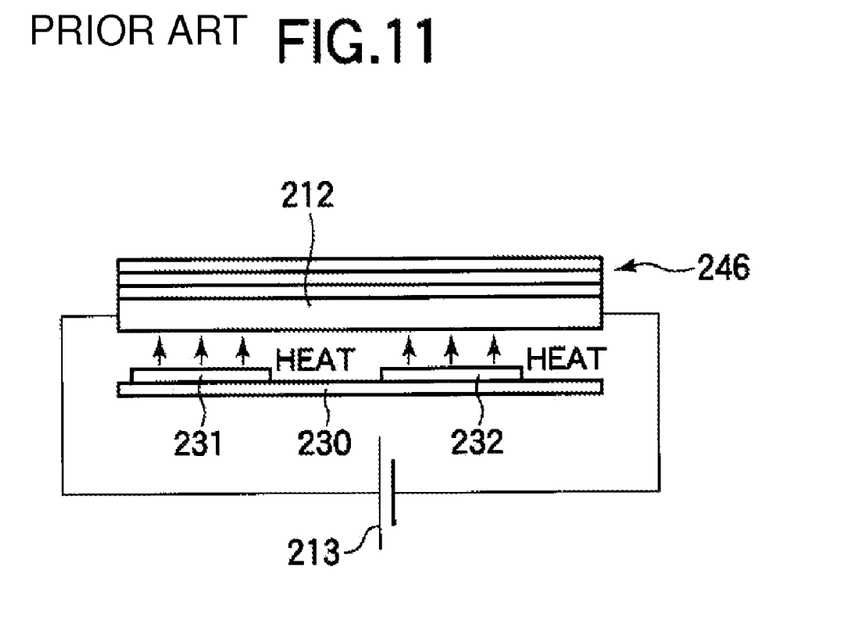
FIG. 11 is an illustration schematically depicting a sectional configuration of a liquid crystal display having an electric heater.

In such a liquid crystal display, although display irregularities attributable to temperature irregularities are reduced, the temperature of the liquid crystal display panel itself is not increased. Therefore, no improvement is achieved in the response of the liquid crystal. Therefore, a problem arises in that degradation of the response of the liquid crystal results in an extremely long screen rewriting time especially at low temperatures. FIG. 11 is an illustration schematically depicting a sectional configuration of a liquid crystal display having an electric heater. In order to solve the above-described problem, for example, a configuration as depicted in FIG. 11 may be employed. Specifically, a film-like electric heater 212 generating heat from electric power supplied by a battery 213 is provided on a bottom surface of a liquid crystal display panel 246, whereby the liquid crystal layer is heated to improve the response of the liquid crystal.

The above-described configuration including an electric heater provided on a bottom surface of a liquid crystal display panel has a problem in that high electric power is consumed to generate heat by the electric heater. In particular, when a liquid crystal display having such a configuration is provided in a battery-driven electronic apparatus, a problem arises in that power dissipation of the battery is significantly accelerated.

SUMMARY

A liquid crystal display includes a display section performing display using a liquid crystal, a substrate disposed to face a bottom surface of the display section and having a circuit for driving the liquid crystal mounted thereon, and a heat diffusing section disposed in contact with the bottom surface of the display section and a top surface of the substrate and having thermal conductivity higher than the thermal conductivity of air.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

A liquid crystal display 100 and an electronic apparatus having the display according to an embodiment will now be described with reference to FIGS. 1A to 8.

The liquid crystal display will be described with reference to FIGS. 1A to 5.

Figure 1A:
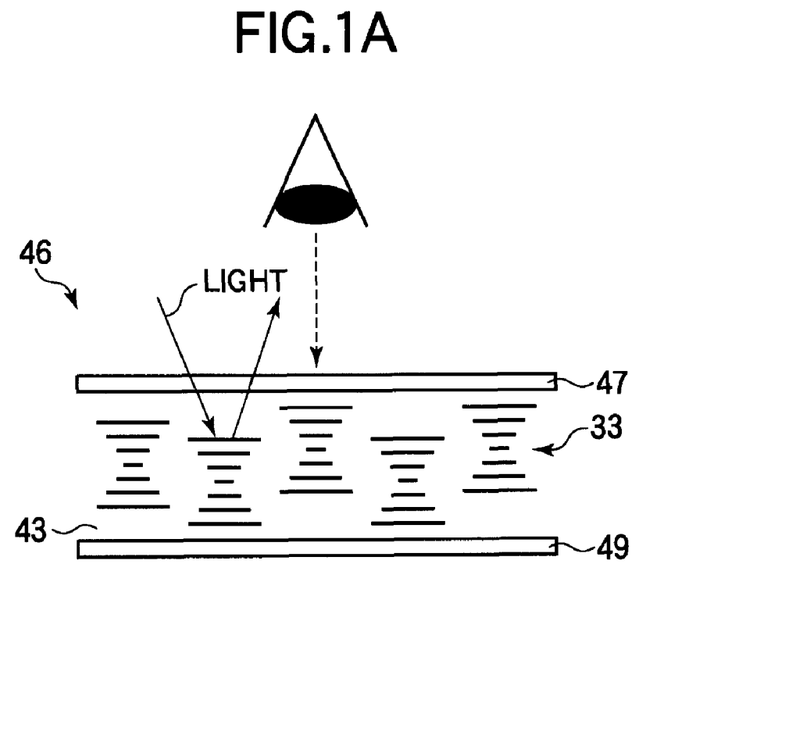
FIGS. 1A and 1B are illustrations schematically depicting sectional configurations of a liquid crystal display panel utilizing a cholesteric liquid crystal according to an embodiment.
Figure 1B:
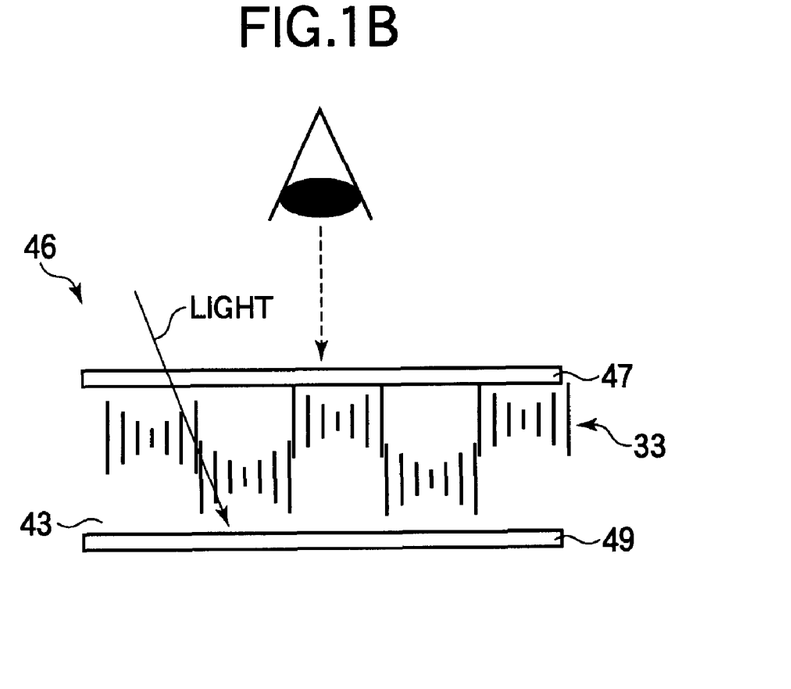

FIGS. 1A and 1B schematically depict sectional configurations of a liquid crystal display panel utilizing a cholesteric liquid crystal. FIG. 1A depicts a sectional configuration of the liquid crystal display panel in the planar state, and FIG. 1B depicts a sectional configuration of the liquid crystal display panel in the focal conic state. As depicting in FIGS. 1A and 1B, a liquid crystal display panel unit (display section) 46 includes a pair of electrode substrates 47 and 49 and a liquid crystal layer 43 formed by enclosing a cholesteric liquid crystal between the electrode substrates 47 and 49. The liquid crystal display of the present embodiment has the liquid crystal display panel unit 46 in a three-layer structure formed by liquid crystal display panels 46R, 46G, and 46B (see FIG. 5), and only one of the layers is depicting in FIGS. 1A and 1B.

As depicting in FIG. 1A, liquid crystal molecules 33 in the planar state form helical structures having helical axes substantially perpendicular to surfaces of the electrode substrates. The liquid crystal layer 43 in the planar state selectively reflects light rays having predetermined wavelengths in accordance with the helical pitch of the liquid crystal molecules 33. Therefore, when the liquid crystal layer 43 is put in the planar state at a certain pixel, the pixel enters a bright state. Light undergoes maximum reflection at the liquid crystal when it has a wavelength λ that is given by λ=n·p where n represents the average refractive index of the liquid crystal and p represents the helical pitch. A reflection bandwidth Δλ of the liquid crystal increases with refractive index anisotropy Δn of the same.

As depicted in FIG. 1B, the liquid crystal molecules 33 in the focal conic state form a helical structure having helical axes substantially parallel to the substrate surfaces. In the focal conic state, the liquid crystal layer 43 transmits most of incident light rays. Therefore, when the liquid crystal layer 43 is put in the focal conic state at a certain pixel, the pixel enters a dark state. Black can be displayed in the focal conic state by disposing a visible light absorbing layer on a bottom side of the bottom electrode substrate 49.

Figure 2:
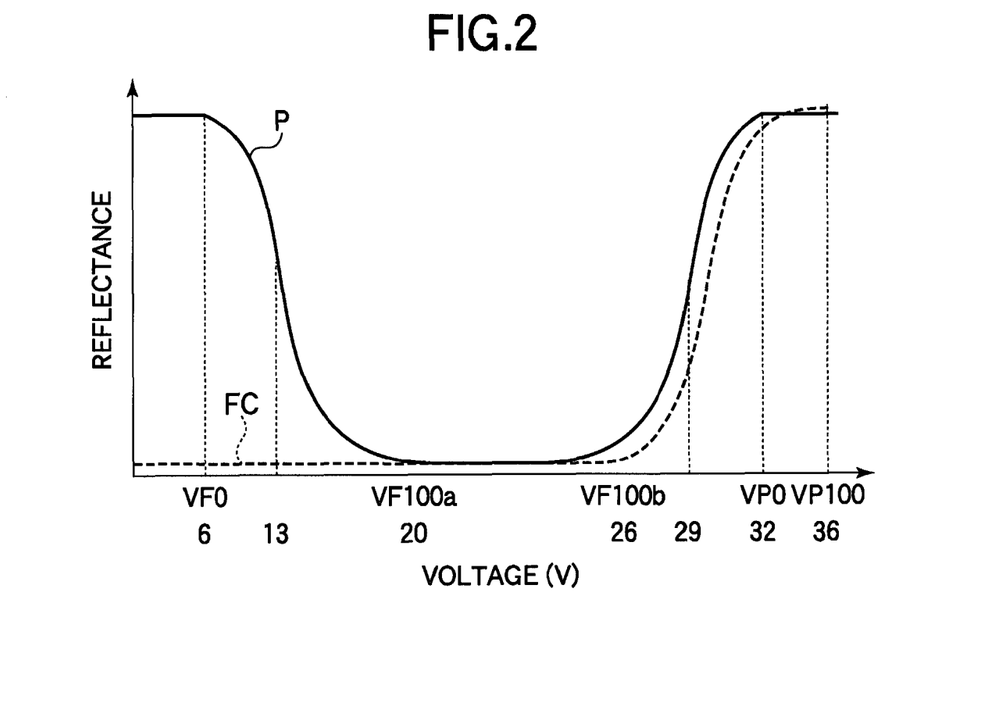
FIG. 2 is a graph depicting an example of voltage-reflectance characteristics of a cholesteric liquid crystal.

FIG. 2 is a graph depicting an example of voltage-reflectance characteristics of the cholesteric liquid crystal. The values of voltages (V) applied to the liquid crystal layer 43 are depicted along the horizontal axis, and reflectances of the liquid crystal layer 43 observed after the application of the voltages are depicted along the vertical axis. The liquid crystal layer 43 is in the planar state when it has relatively high reflectances and is in the focal conic state when it has relatively low reflectances. The curve P in a solid line depicted in FIG. 2 represents voltage-reflectance characteristics of the liquid crystal layer 43 when it is initially in the planar state, and the curve FC in a broken line represents voltage-reflectance characteristics of the liquid crystal layer 43 when it is initially in the focal conic state.

Figure 3A:
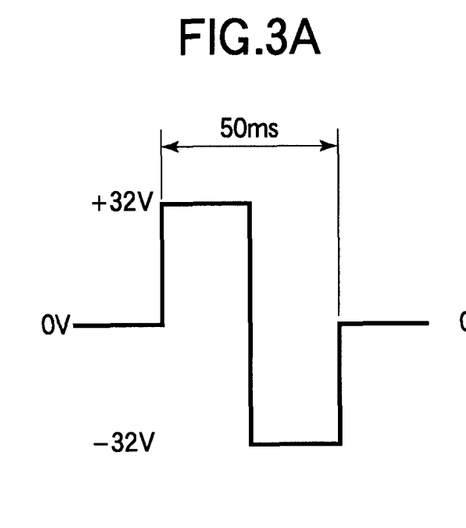
FIGS. 3A and 3B are diagrams depicting voltage waveforms applied to a liquid crystal layer of a pixel in one selection period.
Figure 3B:
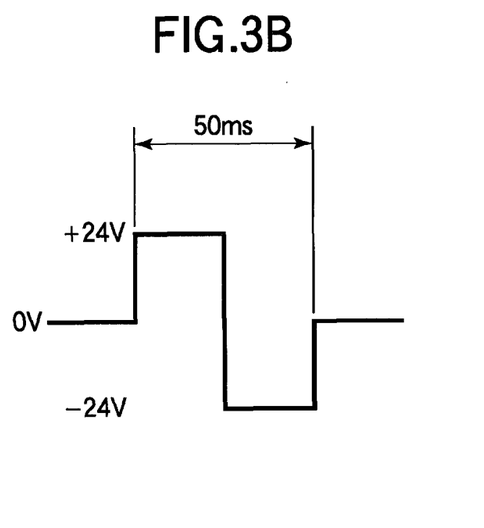

FIG. 3A depicts an example of an effective pulse applied to the liquid crystal layer 43 at a pixel that is to be driven into the planar state, and FIG. 3B depicts an example of an effective pulse applied to the liquid crystal layer 43 at a pixel that is to be driven into the focal conic state. Those effective pulses are applied by a driver IC (integrated circuit) 20 (see FIG. 5) which will be described later.

At a pixel to be driven into the planar state, when the driver IC 20 applies a voltage of +32 V to the liquid crystal layer 43 of the pixel as depicted in FIG. 3A to generate a strong electric field in the liquid crystal layer 43, the helical structures of liquid crystal molecules are completely decomposed, and the liquid crystal enters a homeotropic state in which the directions of the long axes of all liquid crystal molecules follow the direction of the electric field. When the electric field is then abruptly removed from the liquid crystal in the homeotropic state, the helical axes of the liquid crystal become perpendicular to the electrode surfaces, and the liquid crystal enters the planar state in which it selectively reflects light rays having wavelengths in accordance with the helical pitch thereof. Specifically, as depicted in FIG. 2, the liquid crystal layer 43 enters the planar state when a pulse voltage of ±32 V (≈voltage VP0) is applied thereto, and the pixel enters the bright state.

At a pixel to be driven into the focal conic state, when the driver IC 20 applies a voltage of +24 V to the liquid crystal layer 43 of the pixel as depicted in FIG. 3B to generate such a relatively weak electric field that the helical structures of liquid crystal molecules are not completely decomposed in the liquid crystal layer 43 and thereafter the electric field is removed, or when a strong electric field is generated in the liquid crystal layer 43 and is thereafter slowly removed from the layer, the helical axes of the liquid crystal become parallel to the electrode surfaces, and the liquid crystal enters the focal conic state in which it transmits incident light. Specifically, as depicted in FIG. 2, the liquid crystal layer 43 enters the focal conic state when a pulse voltage of ±24V (<voltage VF100b) is applied thereto, and the pixel enters the dark state.

When an electric field having an intermediate intensity is applied and is then abruptly removed, a mixture of the planar state and the focal conic state is obtained, and an intermediate gray level can be displayed in the state.

A voltage value between a voltage VF100$b$ (e.g., 26 V) and a voltage VP0 (e.g., 32 V) or a voltage value between a voltage VF0 (e.g., 6 V) and a voltage VF100$a$ (e.g., 20 V) is used to display an intermediate gray level. When the driver IC 20 applies a pulse voltage having such a voltage value, the state of alignment of the liquid crystal becomes a mixture of the planar state and the focal conic state, and an intermediate gray level may be displayed. Although the operation of displaying an intermediate gray level using a voltage value between the voltages VF0 and VF100$a$ is limited in that the initial state of the liquid crystal must be the planar state, the intermediate gray level may be displayed with small display irregularities, and high display quality may therefore be achieved. When an intermediate gray level is displayed using a voltage value between the voltages VF100$b$ and VP0, the intermediate gray level is displayed with somewhat greater display irregularities, and it is difficult to exercise control for suppressing cross-talk where a general-purpose driver IC is used. However, the operation is advantageous in that writing time may be shortened.

Figure 4:
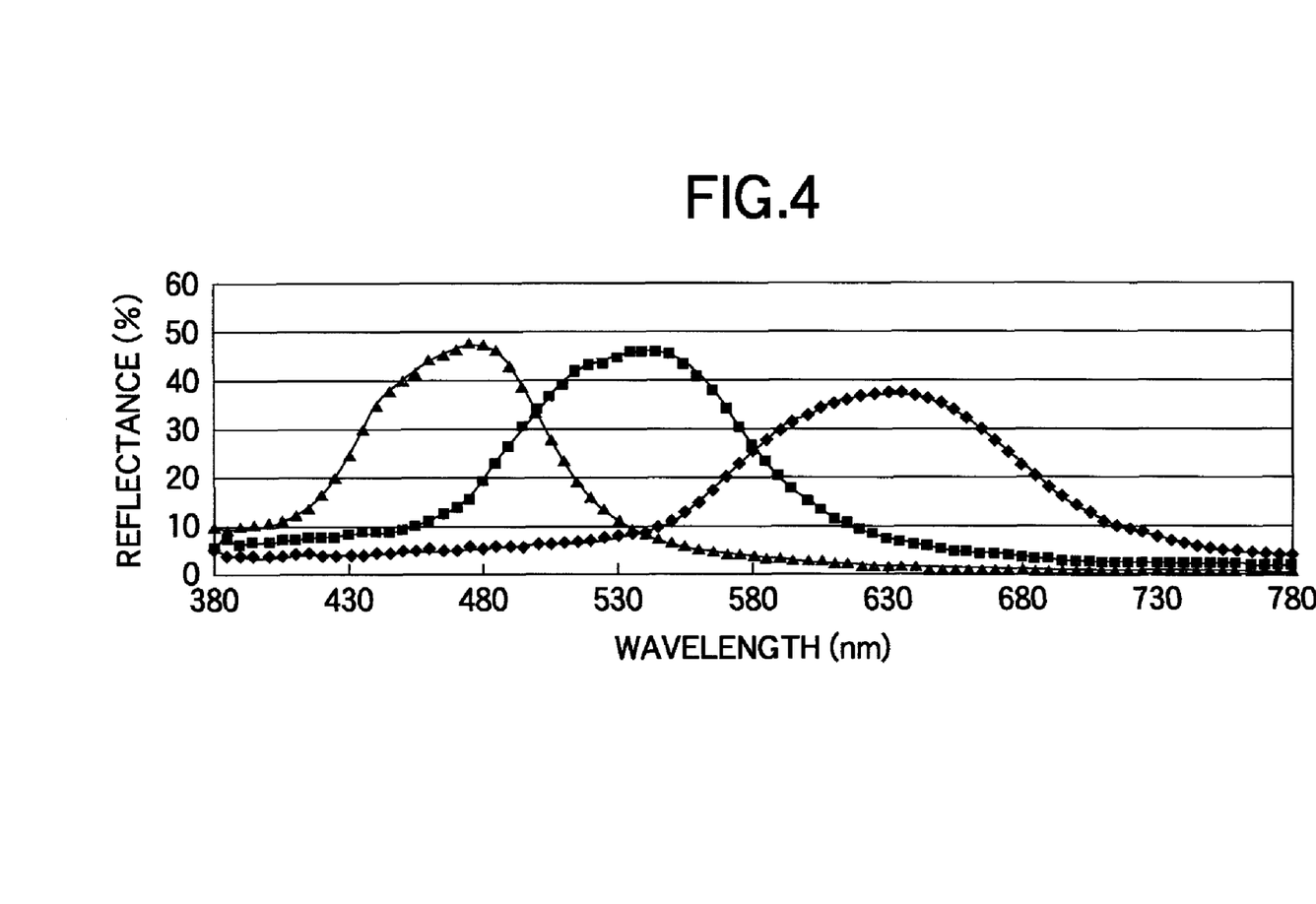
FIG. 4 is a graph depicting an example of reflection spectra observed on a liquid crystal display panel unit in a multi-layer structure.

FIG. 4 depicts an example of reflection spectra of the liquid crystal display panel unit. Wavelengths (nm) are depicted along the horizontal axis, and reflectances (%) are depicted along the vertical axis. The liquid crystal display 100 of the present embodiment includes liquid crystal layers 43 in a three-layer structure as described above. The curve connecting black triangular symbols represents a reflection spectrum observed on a liquid crystal layer 43B. The curve connecting black square symbols represents a reflection spectrum observed on a liquid crystal layer 43G. The curve connecting black rhombic symbols represents a reflection spectrum observed on a liquid crystal layer 43R. The liquid crystal layers selectively reflect circularly polarized light that is either left- or right-handed. Thus, the layers have a theoretical maximum reflectance of 50% and an actual reflectance of about 40%. The helical pitches of liquid crystal molecules in the liquid crystal layers 43R, 43G, and 43B are different from each other, and the layers therefore selectively reflect light rays in respective different colors. Thus, each of the liquid crystal layers 43 has a different display color. As a result, the liquid crystal display panel configured by forming the three liquid crystal display panels 46R, 46G, and 46B one over another is capable of color display because it has the liquid crystal display panel 46B displaying blue with the liquid crystal layer (blue layer) 43B selectively reflecting blue (B) light, the liquid crystal display panel 46G displaying green with the liquid crystal layer (green layer) 43G selectively reflecting green (G) light, and the liquid crystal display panel 46R displaying red with the liquid crystal layer (red layer) 43R selectively reflecting red (R) light.

Figure 5:
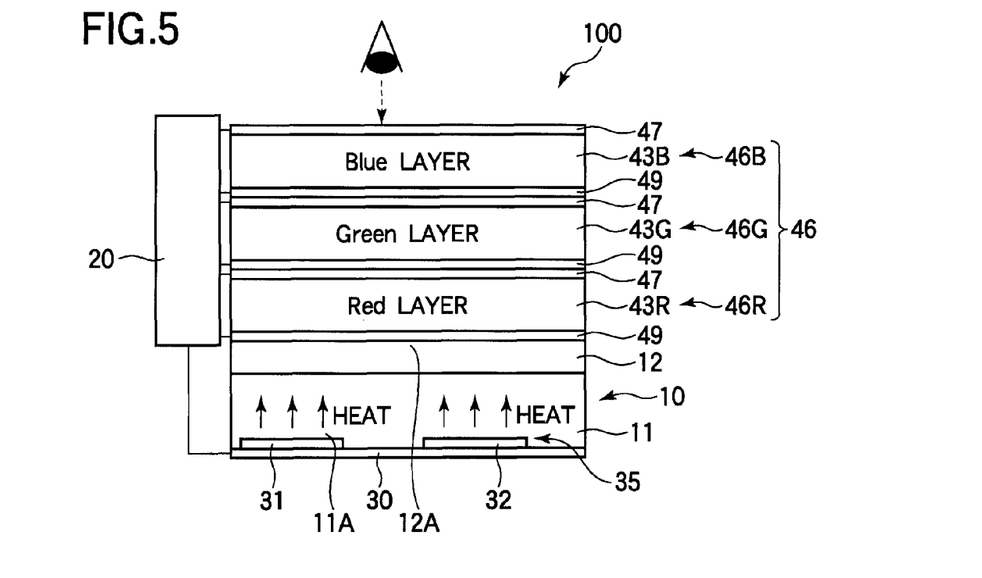
FIG. 5 is an illustration schematically depicting a sectional configuration of a liquid crystal display.

FIG. 5 schematically depicts a sectional configuration of the liquid crystal display 100 of the present embodiment. Let us define that a surface for displaying images and the like of the liquid crystal display 100 in the present embodiment is called a display surface and that the opposite surface of the display is called a bottom surface.

The liquid crystal display 100 has the liquid crystal display panel unit 46, the driver IC 20, a circuit substrate 30, and a heat diffusing section 10.

The liquid crystal display panel unit 46 is provided such that display surface side thereof may be viewed from outside. As described above, the liquid crystal display panel unit 46 includes three liquid crystal display panels 46R, 46G, and 46B formed by enclosing a cholesteric liquid crystal between the pair of electrode substrates 47 and 49. Referring to the liquid crystal display panels 46R, 46G, and 46B, the liquid crystal display panel 46B for displaying blue, the liquid crystal display panel 46G for displaying green, and the liquid crystal display panel 46R for displaying red are formed one over another in the order listed starting from, for example, the display surface side (the top side of FIG. 5). In general, a liquid crystal layer reflects light rays having shorter wavelength, the greater the chiral material content of the same. In the case of the liquid crystal display panel unit 46 depicted in FIG. 5, the liquid crystal layer 43B of the liquid crystal display panel 46B includes the greatest amount of chiral material, and the liquid crystal molecules therein have a great twist and a short helical pitch. Further, a liquid crystal layer tends to require a higher driving voltage, the greater the chiral material content thereof, in general. For this reason, a liquid crystal layer 43 is formed with a smaller thickness, the further the layer from a circuit substrate 30 or closer the layer to the display surface. Therefore, the thickness of the liquid crystal display panel 46B is smaller than the thicknesses of the liquid crystal display panels 46G and 46R.

The electrode substrates 47 and 49 of each of the liquid crystal display panels 46R, 46G, and 46B are electrically connected to the driver IC 20. The driver IC 20 includes a scan-side driver IC and a data-side driver IC each of which is connected to the liquid crystal display panel unit 46 just as done in STN (super twisted nematic) mode liquid crystal display panels. In the present embodiment, general-purpose STN drivers are used as the driver ICs. In the case of the liquid crystal display panel unit 46 of the present embodiment obtained by forming the plurality of liquid crystal display panels 46R, 46G, and 46B one over another, a data-side driver IC must be independently provided for each layer, in general. A common scan-side driver IC may be shared by the layers.

The driver IC 20 is connected to a temperature detecting section (not depicted) for detecting the temperature of the liquid crystal display panel unit 46. The driver IC controls an effective pulse waveform for driving the liquid crystal display panel unit 46 based on the temperature of the liquid crystal display panel unit 46 detected by the temperature detecting section. Thus, the driver IC 20 may adjust the magnitude and pulse width of the pulse voltage output to the liquid crystal display panel unit 46 according to the temperature of the liquid crystal display panel unit 46, and the effective pulse waveform becomes a waveform which is optimal for achieving stable color shades and contrast on the liquid crystal display panel unit 46. Control methods commonly used for optimizing an effective pulse waveform includes a method in which the pulse voltage is controlled to become higher, the lower the temperature of the liquid crystal display panel unit 46 and a method in which the pulse width is controlled to become greater. The control of the pulse width is easier to implement, and it allows an increase in the cost of the liquid crystal display 100 to be avoided.

The circuit substrate 30 is disposed to face the surface of the liquid crystal display panel unit 46 opposite to the display surface thereof such that the substrate extends substantially in parallel with the liquid crystal display panel unit 46 at a certain interval from the same. The circuit substrate 30 is electrically connected to the driver IC 20, and the substrate carries various circuits 35 including a processor 31 serving as a control section for driving the liquid crystals in the liquid crystal layers 43R, 43G, and 43B through the driver IC 20 and controlling the liquid crystal display 100 as a whole and a power supply circuit 32. Heat is generated by electric resistance and the like during the operation of those circuits. In particular, a boosting circuit and a regulator included in the power supply circuit 32 and logic circuits such as the processer 31, an FPGA (field programmable gate array), and a CPLD (complex programmable logic device) generate relatively great amount of heat.

The heat diffusing section 10 is disposed between the liquid crystal display panel unit 46 and the circuit substrate 30 in contact with a bottom surface of the liquid crystal display panel unit 46 and a surface of the circuit substrate 30 facing the liquid crystal display panel unit 46. The heat diffusing section 10 is formed in a structure having two layers, i.e., a heat absorbing layer (first layer) 11 formed on the side of the circuit substrate 30 and a radiating layer (second layer) 12 formed on the side of the liquid crystal display panel unit 46. The heat absorbing layer 11 absorbs heat radiated from the circuit substrate 30, and the radiating layer 12 radiates the heat absorbed from the circuit substrate 30 to the liquid crystal display panel unit 46. The heat absorbing layer 11 may be put in contact with heat sources other than the elements on the circuit substrate 30 such as the driver IC 20 to absorb heat from the heat sources.

The heat absorbing layer 11 includes a heat absorbing portion 11A formed on the side of the layer facing the circuit substrate 30. The heat absorbing portion 11A is in contact with substantially the entire surface of the circuit substrate 30 facing the liquid crystal display panel unit 46 to absorb heat primarily from the processor 31 and the power supply circuit 32. Preferably, the heat absorbing portion 11A is in contact with regions of the circuit substrate 30 where relatively great amounts of heat is generated, i.e., the processor 31 and the power supply circuit 32. The portion 11A may be in contact with those regions only, and it may alternatively be in contact with the entire circuit substrate 30 (the top and bottom surfaces of the substrate) so as to cover the same. The heat absorbing layer 11 is formed from an acryl type resin which is material having insulating properties and thermal conductivity higher than the thermal conductively of air. Therefore, the heat absorbing layer 11 may be put in contact with the circuit substrate 30 without concern about shorting of the circuit substrate 30, and a great amount of heat may be thermally conducted to the radiating layer 12. Although the heat absorbing layer 11 is described as being formed from an acryl type resin in the present embodiment, an epoxy type resin or a silicon type resin may alternatively be used as log as it is a material having insulating properties and thermal conductively higher than the thermal conductivity of air.

The radiating layer 12 includes a radiating portion 12A formed on the side of the layer facing the liquid crystal display panel unit 46. The radiating portion 12A is in tight contact with substantially the entire bottom surface of the liquid crystal display panel unit 46 to radiate the heat absorbed by the heat absorbing layer 11 to substantially the entire bottom surface of the liquid crystal display panel unit 46 substantially uniformly. The radiating layer 12 is formed from a material including aluminum having conductive properties and thermal conductivity higher than the thermal conductivity of air. The radiating layer 11 is formed from a material having thermal conductivity higher than the thermal conductivity of the liquid crystal display panel unit 46, and heat is diffused faster in the radiating layer 12 than in the liquid crystal display panel unit 46. Therefore, the radiating layer 12 may substantially uniformly radiate heat to the liquid crystal display panel unit 46. Although the radiating layer 12 is described as being formed from a material including aluminum in the present embodiment, a material including an element other than aluminum may alternatively be used as long as it is a material having thermal conductivity higher than the thermal conductivity of air.

In the above-described configuration, heated generated as a result of an operation of the circuit substrate 30 is absorbed into the absorbing layer 11 through the heat absorbing portion 11A of the heat diffusing section 10. The heat absorbed into the heat absorbing layer 11 is thermally conducted to the radiating layer 12 and diffuses in the radiating layer 12. The heat diffused in the radiating layer 12 is thermally conducted to the bottom surface of the liquid crystal display panel unit 46 substantially uniformly. The heat thermally conducted to the liquid crystal display panel unit 46 is thermally conducted to the liquid crystal layers 43R, 43G, and 43B sequentially and diffused in the liquid crystal display panel unit 46. At this time, the liquid crystal layer 43B is easily heated even though it is a layer provided outwardly of the liquid crystal layers 43G and 43R, i.e., the outermost layer because the liquid crystal layer 43B has a thickness smaller than those of the liquid crystal layers 43G and 43R and therefore has a smaller thermal capacity.

When the liquid crystal display panel unit 46 is heated and the temperature of the liquid crystal display panel unit 46 is increased even in a small amount, for example, from −10° C. to −5° C. as depicted in FIG. 9, an effective pulse width required for a liquid crystal to respond may be reduced from about 40 ms to about 30 ms. That is, rewriting time may be reduced by about 25%. Although such an effect appears even at normal temperatures, the effect becomes more significant, the lower the temperature of the panel. For example, a pulse width require for a liquid crystal to respond may be reduced from about 160 ms to about 80 ms by a small increase of the temperature of the liquid crystal display panel unit 46 from −20° C. to −15° C. That is, time required for rewriting an image displayed on the liquid crystal display panel unit 46 is reduced in an amount as great as 50%.

JP-A-2002-82325 discloses a liquid crystal display (display element) utilizing a cholesteric liquid crystal in which a radiating layer (heat-leveling layer) is provided on a bottom surface of a light absorbing layer of a liquid crystal display panel to allow display irregularities attributable to temperature irregularities to be reduced. However, there is no mention in JP-A-2002-82325 about the positional relationship between the radiating layer and a circuit substrate, and no idea is presented about active utilization of heat generated at the circuit substrate to use the circuit substrate as a heater for heating the liquid crystal display panel. The liquid crystal display 100 of the present embodiment includes the heat diffusing section 10 formed in a structure having two layers, i.e., the radiating layer 12 for uniformly conducting heat to the liquid crystal display panel unit 46 and the heat absorbing layer 11 which thermally conducts heat generated at the circuit substrate 30 to the radiating layer 12 while being electrically insulated from the circuit substrate 30. Thus, the liquid crystal display 100 of the present embodiment is different from the liquid crystal display disclosed in JP-A-2002-82325 in that the heat diffusing section 10 are in tight contact with the entire surfaces of the circuit substrate 30 and the liquid crystal display panel unit 46 to thermally conduct heat generated at the circuit substrate 30 to the liquid crystal display panel unit 46 in an active manner and that the circuit substrate 30 is therefore used as a heater for the liquid crystal display panel unit 46.

JP-A-2006-39072 discloses a PDP (plasma display panel) in which a thermal conduction sheet for suppressing temperature irregularities is put in tight contact with a bottom surface of a display panel and in which a frame chassis is provided on a surface of a circuit substrate for diffusing heat radiated from circuit elements through the thermal conduction sheet and an air layer to allow display irregularities and a reduction in the life of the circuit elements to be effectively suppressed. However, the PDP does not need to be heated by a heater unlike display panels utilizing a liquid crystal or the like. Further, JP-A-2006-39072 is the same as JP-A-2002-82325 in that no idea is presented about thermally conducting heat generated at the circuit substrate to the display panel in an active manner to use the circuit substrate as a heater for heating the display panel. Thus, the liquid crystal display 100 of the present embodiment is different from the configuration of the display panel and the circuit substrate of the PDP disclosed in JP-A-2006-39072 in that heat generated at the circuit substrate 30 is thermally conducted to the liquid crystal display panel unit 46 in an active manner to use the circuit substrate 30 as a heater for the liquid crystal display panel unit 46.

Further, JP-A-56-043677 discloses a liquid crystal display in which a thermal conduction plate having high thermal conductivity is provided on a bottom surface of a liquid crystal display panel to suppress display irregularities attributable to temperature irregularities. However, according to the JP-A-56-043677, a space is formed between the liquid crystal display panel and the thermal conduction plate, and no idea is presented about thermally conducting heat generated at a circuit substrate to the liquid crystal display panel in an active manner to use the circuit substrate as a heater. Thus, the liquid crystal display 100 of the present embodiment is different from the liquid crystal display disclosed in JP-A-56-043677 in the same point that the display is different from JP-A-2002-82325 and JP-A-2006-39072.

The liquid crystal display 100 of the present embodiment includes the heat diffusing section 10 which is disposed in contact with the bottom surface of the liquid crystal display panel unit 46 and the top surface of the circuit substrate 30 and which has thermal conductivity higher than the thermal conductivity of air. As a result, heat generated as a result of an operation of the circuit substrate 30 is efficiently thermally conducted to the liquid crystal display panel unit 46 to heat the liquid crystal display panel unit 46 without using an electric heater or the like. Thus, response of a liquid crystal may be improved without increasing power consumption.

The heat diffusing section 10 has a multi-layer structure, and the radiating layer 12 is provided on the side of the section facing the liquid crystal display panel unit 46, the layer being formed with the radiating portion 12A which is in tight contact with substantially the entire bottom surface of the liquid crystal display panel unit 46 to radiate heat to the liquid crystal display panel unit 46 substantially uniformly. Thus, the heat diffusing section 10 substantially uniformly radiates heat to the liquid crystal display panel unit 46. As a result, display irregularities attributable to temperature irregularities may be reduced on the display surface of the liquid crystal display panel unit 46.

Further, the heat diffusing section 10 includes the heat absorbing portion 11A which is in contact with regions of the circuit substrate 30 where relatively great amounts of heat are generated to absorb heat from the circuit substrate 30. Thus, the heat diffusing section 10 may effectively absorb heat from the circuit substrate 30. As a result, the heat diffusing section 10 may efficiently heat the liquid crystal display panel unit 46.

Figure 6:
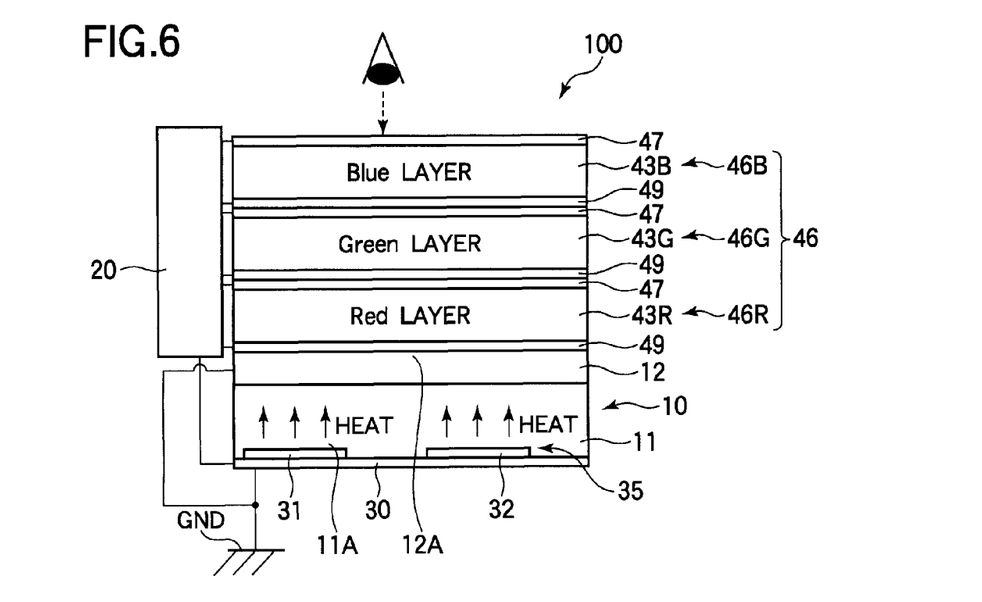
FIG. 6 is an illustration schematically depicting a sectional configuration of a liquid crystal display according to a modification of the embodiment.

FIG. 6 schematically depicts a sectional configuration of a liquid crystal display 100 according to a modification of the present embodiment. As depicted in FIG. 6, the liquid crystal display 100 has a configuration in which a radiating layer 12 is connected to the ground (GND) of a circuit substrate 30. The radiating layer 12 is formed from a conductive material and electrically connected to the ground (GND) of the circuit substrate 30 or the like. Thus, the radiating layer 12 may function as a shield for absorbing electromagnetic wave noise.

Figure 7:
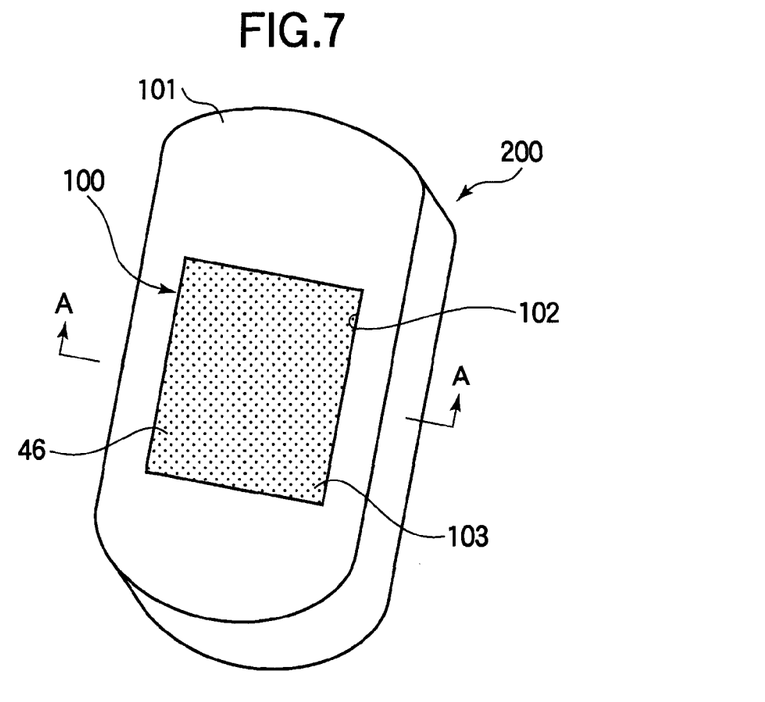
FIG. 7 is a perspective view of a portable telephone.

A portable telephone 200 as an electronic apparatus according to the embodiment will now be described with reference to FIGS. 7 and 8. FIG. 7 is a perspective view of the portable telephone (electronic apparatus) 200.

As depicted in FIG. 7, the portable telephone 200 has a housing 101. The housing 101 is formed with a hole serving as a display window 102 in the middle of a front surface thereof. A liquid crystal display 100 is fitted in the display window 102. Thus, the liquid crystal display 100 is housed in the housing 101 such that a display surface of a liquid crystal display panel unit 46 thereof may be viewed from outside. Further, the portable telephone 200 has operation buttons (not depicted) with which various instructions are given for operations such as input of a telephone number. Let us define that a surface for displaying images and the like of the liquid crystal display panel unit 46 in this embodiment is called a display surface and that the opposite surface of the panel is called a bottom surface.

Figure 8:
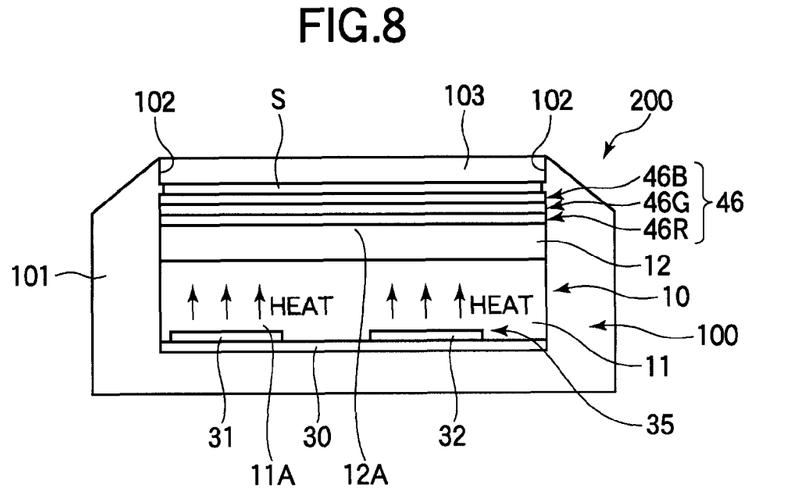
FIG. 8 is an illustration schematically depicting a sectional configuration of the portable telephone.

FIG. 8 is a schematic sectional view of the portable telephone 200 taken along the line A-A in FIG. 7.

Referring to the liquid crystal display panel unit 46 of the present embodiment, as depicted in FIG. 8, a liquid crystal display panel unit 46B for displaying blue, a liquid crystal display panel 46G for displaying green, and a liquid crystal display panel 46R for displaying red are housed in the order listed starting from the display surface side (top side in FIG. 8).

The housing 101 is formed such that it covers outer surfaces of the liquid crystal display 100 except the display surface.

On the display surface side of the liquid crystal display 100, a cover 103 is externally disposed to face the display surface of the liquid crystal display panel unit 46 to cover the same with a certain interval kept between the cover and the liquid crystal display panel unit 46. The cover 103 serves as a member for protecting the liquid crystal display 100, and it is formed from a transparent resin. Thus, the cover 103 covers the display surface of the liquid crystal display panel unit 46 such that the display surface of the liquid crystal display panel unit 46 may be viewed from outside. It is desirable that the cover 103 is formed from a material having low thermal conductivity. A space is formed between the cover 103 and the liquid crystal display panel unit 46, and the space is filled with air to form an air layer S having heat insulating properties.

The portable telephone 200 utilizing the liquid crystal display 100 has the air layer S formed outside the liquid crystal display panel unit 46. Due to the heat insulating properties of the air layer S, heat conducted to the liquid crystal layer 43B is scarcely transferred to the air layer S and is therefore scarcely radiated to outside. Further, even when heat of the liquid crystal display panel unit 46 is thermally conducted to the air layer S, the heat thermally conducted to the air layer S will be scarcely radiated to outside due to the heat insulating properties of the cover 103.

In the portable telephone 200 of the present embodiment, the liquid crystal display 100 is housed in the housing 101, and the housing 101 has the cover 103 disposed at a certain interval from the liquid crystal display panel unit 46. As a result, a space is formed between the cover 103 and the liquid crystal display panel unit 46, and the space is filled with air to serve as the air layer S. Thus, heat thermally conducted to the liquid crystal display panel unit 46 is scarcely radiated from the liquid crystal display panel unit 46 to outside. Thus, heat insulation is provided for the external layer of the liquid crystal display panel unit 46 which is less effectively heated than internal layers to allow response of the liquid crystals to be improved. Further, a temperature difference between the internal and external layers may be reduced.

The invention has been described above based on embodiments of the same, and the invention may be modified in various ways without being limited to the above-described embodiments.

For example, the above-described embodiment has a configuration in which a heat insulating effect is provided by disposing the cover 103 at a certain interval from the liquid crystal display panel unit 46 to form the air layer S. The invention is not limited to such a configuration, and it may be applied to a configuration in which the cover 103 and the liquid crystal display panel unit 46 are put in tight contact with each other without forming the air layer S to achieve improved visibility through a reduction in reflection noise (degradation of visibility attributable to reflection of light).

While the driver IC 20 is provided outside the circuit substrate 30 in the above-described embodiment, the invention is not limited to such a configuration. The driver IC may be used by mounting it on the circuit substrate 30, and heat from the driver IC may be absorbed by the heat diffusing section 10.

While cholesteric liquid crystals are used in the liquid crystal display panel unit 46 in the above-described embodiment, the invention is not limited to such a material. Although liquid crystals are a typical material which is affected by temperatures, there are many other materials having such a property, and the invention may be applied to various display panels using such materials.

Further, the liquid crystal layers 43 in the above-described embodiment include the liquid crystal layer 43B for displaying blue, the liquid crystal layer 43G for displaying green, and the liquid crystal layer 43R for displaying red formed one over another in the order listed starting from the display surface side. The invention is not limited to such a configuration, and it may be applied to two liquid crystal layers for displaying two colors and a different number of liquid crystal layers.

While the portable telephone 200 has been described above as an embodiment of an electronic apparatus according to the invention, the invention is not limited to such an apparatus, and it may be applied to other electronic apparatus such as electronic paper as long as the apparatus include a liquid crystal display panel which is affected by temperatures. The invention is more advantageous, the smaller the liquid crystal panel included in an electronic apparatus to which the invention is applied. The invention is advantageous especially when applied to a battery-driven electronic apparatus because the liquid crystal panel of the apparatus may be heated without accelerating the dissipation of the battery.

The invention may be applied to various liquid crystal displays to improve response of a liquid crystal which is affected by temperatures.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A liquid crystal display comprising:
   a display section performing display using a liquid crystal;
   a substrate disposed to face a bottom surface of the display section and having a circuit for driving the liquid crystal mounted thereon; and
   a heat diffusing section disposed in contact with the bottom surface of the display section and a top surface of the substrate and having thermal conductivity higher than the thermal conductivity of air so that time required for rewriting a still image is reduced by heat radiated from the heat diffusing section to the display section,
   wherein the liquid crystal is a liquid crystal which forms a cholesteric phase.

2. The liquid crystal display according to claim 1, wherein the heat diffusing section includes a radiating portion which is in tight contact with substantially the entire bottom surface of the display section to radiate heat to the display section.

3. The liquid crystal display according to claim 1, wherein the heat diffusing section includes a heat absorbing portion which is in contact with a region of the substrate where a relatively great amount of heat is generated to absorb heat from the substrate.

4. The liquid crystal display according to claim 3, wherein the heat diffusing section absorbs heat from a heat source other than the substrate.

5. The liquid crystal display according to claim 1, wherein the heat diffusing section has a multi-layer structure including:
   a first layer formed on a side of the substrate and provided with a heat absorbing portion for absorbing heat from the substrate; and
   a second layer formed on a side of the display section and provided with a radiating portion for radiating heat to the display section.

6. The liquid crystal display according to claim 5, wherein the first layer of the heat diffusing section is formed from an insulating material.

7. The liquid crystal display according to claim 6, wherein the insulating material is any of an acryl type resin, an epoxy type resin, and a silicon type resin.

8. The liquid crystal display according to claim 5, wherein the second layer of the heat diffusing section is formed from a conductive material.

9. The liquid crystal display according to claim 8, wherein the second layer is electrically connected to ground of the substrate.

10. The liquid crystal display according to claim 8, wherein the conductive material includes aluminum.

11. The liquid crystal display according to claim 1, further comprising:
    a housing for housing the display section such that a display surface of the display section is viewed from outside and for housing the heat diffusing section and the substrate on a bottom surface side of the display section.

12. The liquid crystal display according to claim 11, wherein the housing includes a cover which is formed from a transparent material to cover the display surface such that the display surface is viewed from outside and which is disposed at an interval from the display section.

13. The liquid crystal display according to claim 1, wherein the display section has a multi-layer structure including at least two layers displaying respective different colors.

14. The liquid crystal display according to claim 13, wherein the display section has a structure having three layers displaying blue, green, and red, respectively.

15. The liquid crystal display according to claim 13, wherein the thickness of each of the layers formed at the display section is smaller, the further the layer from the substrate.

16. An electronic apparatus comprising the liquid crystal display according to claim 1.

* * * * *